United States Patent
Chilver (10) Patent No.: US 12,495,932 B2
(45) Date of Patent: Dec. 16, 2025

(54) AUTOMATIC TOASTER

(71) Applicant: John Chilver, Toronto (CA)

(72) Inventor: John Chilver, Toronto (CA)

( * ) Notice: Subject to any disclaimer, the term of this patent is extended or adjusted under 35 U.S.C. 154(b) by 0 days.

(21) Appl. No.: 19/078,185

(22) Filed: Mar. 12, 2025

(65) Prior Publication Data
US 2025/0318684 A1    Oct. 16, 2025

Related U.S. Application Data

(63) Continuation of application No. PCT/CA2025/050132, filed on Jan. 31, 2025.

(60) Provisional application No. 63/549,960, filed on Feb. 5, 2024.

(51) Int. Cl.
A47J 37/08    (2006.01)

(52) U.S. Cl.
CPC .......... *A47J 37/085* (2013.01); *A47J 37/0835* (2013.01); *A47J 37/0842* (2013.01)

(58) Field of Classification Search
CPC ........ A47J 37/00; A47J 37/08; A47J 37/0835; A47J 37/0842; A47J 37/085
See application file for complete search history.

(56) References Cited

U.S. PATENT DOCUMENTS

| | | |
|---|---|---|
| 11,206,949 B1 | 12/2021 | Cheng |
| 2016/0327279 A1 | 11/2016 | Bhogal et al. |
| 2024/0251994 A1 * | 8/2024 | Sampath ............... A47J 37/085 |

FOREIGN PATENT DOCUMENTS

| | | | |
|---|---|---|---|
| EP | 3133965 B1 * | 9/2020 | ............. A47J 31/52 |
| GB | 2537408 A * | 10/2016 | ............. H05B 3/28 |

* cited by examiner

*Primary Examiner* — Hung D Nguyen
(74) *Attorney, Agent, or Firm* — McMillan LLP (57) ABSTRACT

A toaster comprising: a body configured to hold toastable foodstuff; one or more heating elements mounted to the body and configured to heat foodstuff held by the body; one or more acoustic sensors mounted to the body and configured to: pick up one or more sounds produced by the foodstuff when the foodstuff is heated by the heating elements; and generate an audio signal based on the sounds; and a controller configured to control the heating elements based at least in part on the audio signal generated by the acoustic sensors.

20 Claims, 4 Drawing Sheets

AUTOMATIC TOASTER

CROSS-REFERENCE TO RELATED APPLICATIONS

This application is a continuation of International Patent Application No. PCT/CA2025/050132, filed 31 Jan. 2025, which in turn claims priority from application No. 63/549,960, filed 5 Feb. 2024, each of which is incorporated by reference herein in its entirety. For purposes of the United States, this application claims the benefit under 35 U.S.C. § 119 of application No. 63/549,960, filed 5 Feb. 2024, and entitled AUTOMATIC TOASTER.

TECHNICAL FIELD

The present disclosure is directed to an automatic toaster. More particularly, the present disclosure is directed to a toaster having one or more sensors to toast food according to feedback from the sensors.

BACKGROUND

Toasters are commonly used to heat, and thereby toast, a variety of foods.

A problem with the use of thermostatic, timing devices and temperature sensors is that these require an operator to guess at the time needed to reach an ideal browning of the food. If a variety of different foodstuffs are to be inserted into the toaster, each of which has different qualities such as moisture content, density and/or temperatures, the operator is unlikely to be able to set the timer to the correct setting except by experimenting and remembering the correct timing required for each particular foodstuff. An incorrectly set thermostat or timer may result in under-toasted foodstuff or burnt foodstuff.

In order to toast frozen foodstuffs, some electronic toasters have an additional 'defrost' mode which extends the time of heating. One disadvantage of such prior art toasters is that a user must remember to select the defrost mode. Another disadvantage is that a user can still not be sure whether a frozen foodstuff will be over or under-toasted.

Prior art toasters often suffer from problems such as storing heat after an initial toasting cycle and, due to the manner in which prior art toasters are controlled, this stored heat can lead to over-toasting of food in an immediately subsequent toasting cycle if a user does not change various settings on the toaster. It would be desirable for a toaster to toast food correctly, independent of the toasting temperature and the type and temperature of food being toasted whilst using robust, readily available sensors.

A problem with the use of optical devices in sensing the color of food being toasted is that it is a complex process and toasters which employ this technique suffer from the problem of being unreliable due to, among other things, the different optical properties of the foodstuff being toasted. It is also not always clear which particular part of a foodstuff being toasted needs to be 'looked at' by such optical devices.

A problem with toasting devices which detect gases coming off of food being toasted is that it involves the use of sensitive, specialized sensors which may only detect and act upon gases released by any areas of browning/burning. There is no way to average out only specified areas of input, or omit anomalous input.

Also known in the art are toasters which incorporate an ionization chamber to detect particulates released from foodstuffs as they are toasted. A problem with this technology is accuracy due to the difference in quantity and type of released particulates from different types of foodstuffs when heated. Again, there is no apparent way to average out, or omit anomalous input.

There is a general desire for an improved toaster. More particularly, there is a general desire for an improved toaster that may toast foodstuff independent of the toasting temperature and the type and temperature of foodstuff being toasted.

The foregoing examples of the related art and limitations related thereto are intended to be illustrative and not exclusive. Other limitations of the related art will become apparent to those of skill in the art upon a reading of the specification and a study of the drawings.

SUMMARY

Further aspects and example embodiments are illustrated in the accompanying drawings and/or described in the following description.

One aspect of the invention provides a toaster comprising: a body configured to hold toastable foodstuff; one or more heating elements mounted to the body and configured to heat foodstuff held by the body; one or more acoustic sensors mounted to the body and configured to: pick up one or more sounds produced by the foodstuff when the foodstuff is heated by the heating elements; and generate an audio signal based on the sounds; and a controller configured to control the heating elements based at least in part on the audio signal generated by the acoustic sensors.

One aspect of the invention provides a method for toasting toastable foodstuff with a toaster, the method comprising: holding the toastable foodstuff with the toaster; toasting the toastable foodstuff with one or more heating elements of the toaster; picking up one or more sounds produced by the foodstuff with one or more acoustic sensors of the toaster when the foodstuff is toasted by the heating elements; generating an audio signal based on the sounds; and controlling the heating elements based at least in part on the audio signal.

In some embodiments, the controller is configured to: one or both of: lookup in a toasting table a threshold sound of toasting corresponding to the threshold level of toasting; and determine the threshold sound of toasting corresponding to the threshold level of toasting with an AI; and wherein turning off the heating elements in response to the inferred level of toasting exceeding a threshold level of toasting comprises turning off the heating elements in response to the sound of toasting exceeding the threshold sound of toasting.

In some embodiments, controlling the heating elements based at least in part on the audio signal comprises: one or both of: looking up in a toasting table a threshold sound of toasting corresponding to the threshold level of toasting; and determining the threshold sound of toasting corresponding to the threshold level of toasting with an AI; and wherein turning off the heating elements in response to the inferred level of toasting exceeding a threshold level of toasting comprises turning off the heating elements in response to the sound of toasting exceeding the threshold sound of toasting.

In addition to the exemplary aspects and embodiments described above, further aspects and embodiments will become apparent by reference to the drawings and by study of the following detailed descriptions.

BRIEF DESCRIPTION OF THE DRAWINGS

The accompanying drawings illustrate non-limiting example embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

The present disclosure is directed to an automatic toaster having one or more heating elements and one or more acoustic sensors, wherein the heating elements are controlled at least in part based on sounds of toasting received by the acoustic sensors when a toastable foodstuff is heated with the heating elements. The toaster may identify an amount of toasting of the foodstuff from the sounds of toasting, and thereby control the amount of toasting of the foodstuff. Controlling the amount of toasting of the foodstuff based at least in part on the sounds of toasting may more accurately control the amount of toasting of the foodstuff than other methods of controlling the amount of toasting, for example controlling the amount of toasting based merely on time alone.

The heating elements are controlled by a controller, and the controller is configured to receive an audio signal generated by the acoustic sensors. In some embodiments, the controller may identify a sound of toasting in the audio signal and control the heating elements based at least in part on the identified sound of toasting. The sound of toasting identified in the audio signal may be compared with predetermined sounds of toasting to quantify an inferred level of toasting of the foodstuff. The predetermined sounds of toasting may be predetermined empirically, or generated at least in part with a machine learning algorithm or an artificial intelligence (referred to herein as "AI").

In a preferred embodiment, a machine learning algorithm or AI analyzes the input from the acoustic sensors and compares the input with a baseline table of sounds, levels and frequency thereof that is stored within its software or firmware to determine when to terminate the toasting cycle. A machine learning algorithm or AI may be further utilized to analyze and refine the toasting cycle by combining the known, learnt, and live acoustic signal output of toasting different foodstuffs for optimum personalized results.

A machine learning algorithm or AI may additionally combine the results of known and learnt acoustic and timed toasting events based upon user feedback. Once a toasting cycle has been completed, software within the controller could, for example, ask if the user found that the foodstuff was 1) browned correctly, or was: 2) too light, or: 3) too dark, and may also ask if the foodstuff was machine or hand cut. Additional parameters may be added to further refine the toasting outcomes as may be determined by those skilled in the art. Multiple users may be added so that personalized preferences are maintained. Based upon the various user responses and preferences, toasting cycles for various foodstuffs are refined for future use by specified or unspecified users.

Figure 1:
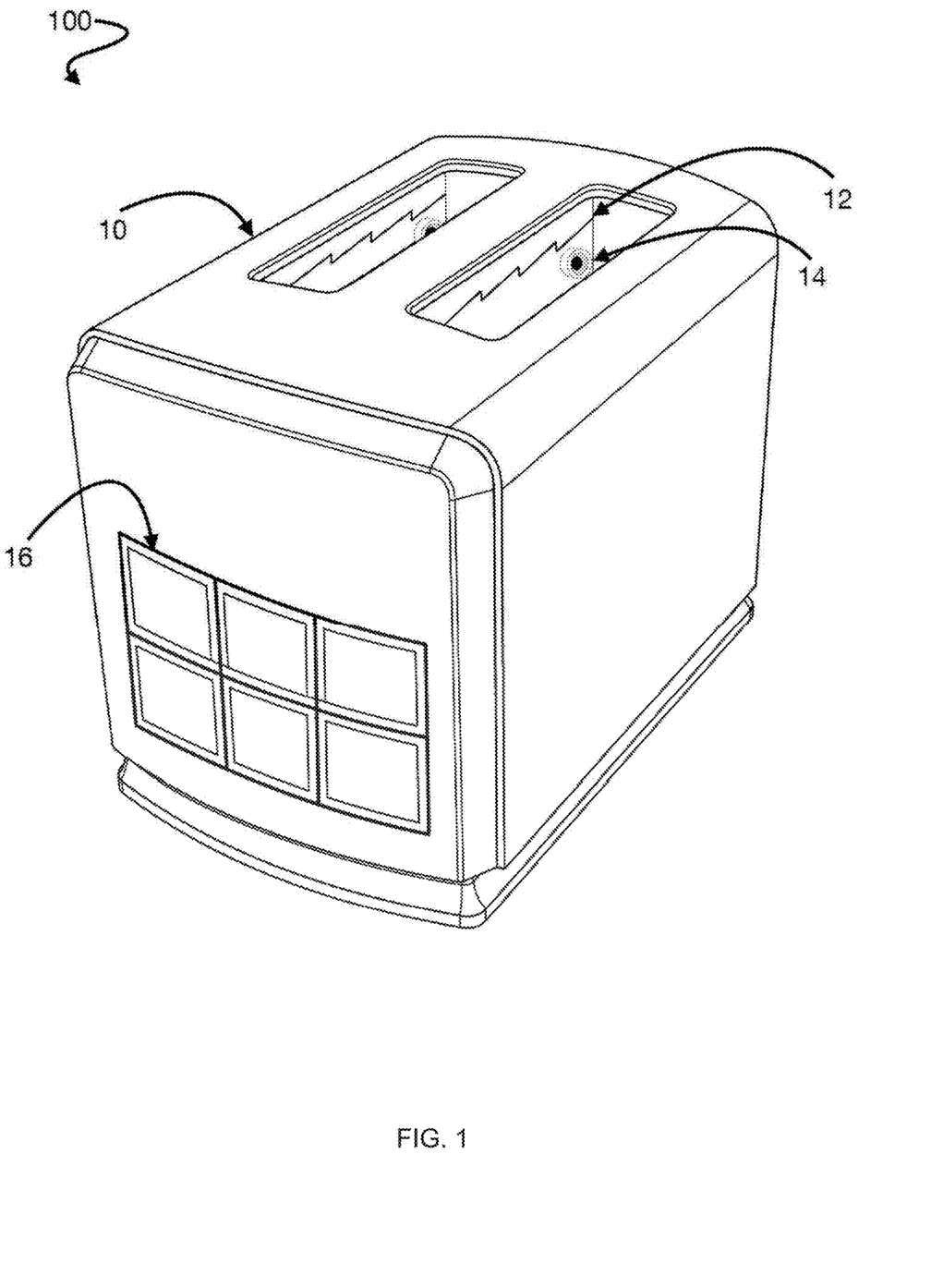
FIG. 1 is a perspective view of a toaster according to a first example embodiment of the present invention.

FIG. 1 is a perspective view of toaster 100 comprising body 10, heating elements 12, acoustic sensors 14, and controller 16. Body 10 is configured to hold toastable foodstuff, for example bread, bagels, waffles, and the like. Heating elements 12 are mounted to body 10 and are configured to heat the foodstuff held by body 10. Acoustic sensors 14 are mounted to body 10 and are configured to pick up sounds produced by the foodstuff when the foodstuff is heated by heating elements 12, and generate an audio signal based on the sounds. Controller 16 is mounted to body 10, and configured to control heating elements 12 based at least in part on the audio signal generated by acoustic sensors 14.

In some embodiments, controller 16 is configured to identify a sound of toasting of the foodstuff in the audio signal, quantify an inferred level of toasting in the sound of toasting, and turn off heating elements 12 in response to the inferred level of toasting exceeding a threshold level of toasting. The sound of toasting may comprise one or more of: a sound of oxidation of carbon present in the foodstuff, a sound of hissing from the foodstuff, and other sounds which may be associated with the process of toasting.

Controller 16 may quantify the inferred level of toasting in the sound of toasting by quantifying one or both of: a frequency of the sound of toasting, and a volume of the sound of toasting. Quantifying the inferred level of toasting in the sound of toasting may further comprise averaging one or both of the frequency of the sound of toasting and the volume of the sound of toasting over a time period. In some embodiments, the time period may be the amount of time since toasting of a foodstuff commenced.

In some embodiments, controller 16 is configured to look up in a toasting table a threshold sound of toasting corresponding to the threshold level of toasting. Where a threshold sound of toasting is identified, turning off the heating elements in response to the inferred level of toasting exceeding a threshold level of toasting may comprise turning off the heating elements in response to the sound of toasting exceeding the threshold sound of toasting. The toasting table may be stored in a memory of the controller.

The toasting table may comprise a plurality of threshold sounds of toasting and corresponding threshold levels of toasting generated at least in part by a machine learning algorithm or AI.

In one or more embodiments of toaster 100:
- toaster 100 further comprises a toasting control, wherein the threshold level of toasting is set by the toasting control;
- body 10 comprises an ejection mechanism, and controller 16 is further configured to activate the ejection mechanism based at least in part on the audio signal generated by acoustic sensors 14;
- toaster 100 further comprises one or more of a timer, a temperature sensor, an optical sensor, and a gas sensor, and controller 16 is configured to turn off heating elements 12 based at least in part on one or more of the timer, the temperature sensor, the optical sensor, and the gas sensor;
- body 10 is configured to hold toastable foodstuff in two compartments, and acoustic sensors 14 are mounted to body 10 between the two compartments and are configured to pick up one or more sounds produced by the foodstuff in the two compartments when heated by heating elements 12;

acoustic sensors 14 comprise five or more acoustic sensors, and acoustic sensors 14 are mounted to body 10 in one or more of: one or more rows, one or more columns, and an "X" pattern;

toaster 100 further comprises a display, and controller 16 is further configured to display the inferred level of toasting on the display; and/or toaster 100 further comprises a display, and controller 16 is further configured to accept user feedback or instruction via an integrated touchscreen of the display.

In some embodiments of toaster 100, acoustic sensors 14 comprise a first set of one or more acoustic sensors and a second set of one or more acoustic sensors. The first set of acoustic sensors are configured to pick up one or more first sounds produced by a first side of the foodstuff when heated by heating elements 12 and to generate a first audio signal based on the first sounds. The second set of acoustic sensors are configured to pick up one or more second sounds produced by a second side of the foodstuff when heated by heating elements 12 and to generate a second audio signal based on the second sounds. Controller 16 is configured to control heating elements 12 based at least in part on the first audio signal and the second audio signal.

Toaster 100 may further comprise a power supply, and controller 16 may be configured to control the power supply based at least in part on the audio signal generated by acoustic sensors 14. For example, controller 16 may be configured to identify a maximum level of toasting in the audio signal, and turn off the power supply in response to identifying the maximum level of toasting.

Figure 2:
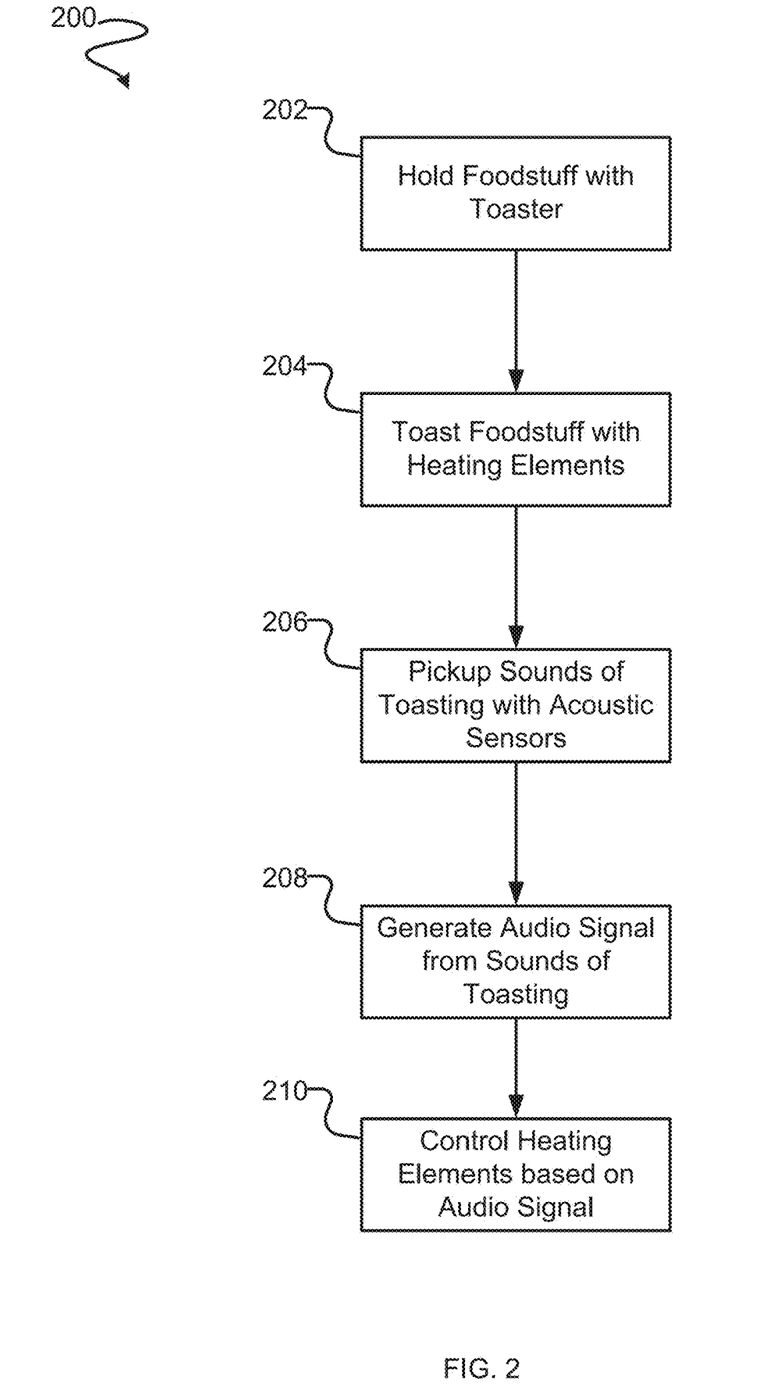
FIG. 2 is a block diagram of a method for toasting toastable foodstuff with a toaster according to an example embodiment of the present invention.

FIG. 2 is a block diagram of method 200 for toasting toastable foodstuff with a toaster, the method comprising:
step 202: holding the toastable foodstuff with the toaster;
step 204: toasting the toastable foodstuff with one or more heating elements of the toaster;
step 206: picking up one or more sounds produced by the foodstuff with one or more acoustic sensors of the toaster when the foodstuff is toasted by the heating elements;
step 208: generating an audio signal based on the sounds; and
step 210: controlling the heating elements based at least in part on the audio signal.

In some embodiments, method 200 is performed by toaster 100.

Step 210 may comprise identifying a sound of toasting of the foodstuff in the audio signal, quantifying an inferred level of toasting in the sound of toasting, and turning off the heating elements in response to the inferred level of toasting exceeding a threshold level of toasting. Step 210 may further comprise looking up in a toasting table a threshold sound of toasting corresponding to the threshold level of toasting; and wherein turning off the heating element in response to the inferred level of toasting exceeding a threshold level of toasting comprises turning off the heating element in response to the sound of toasting exceeding the threshold sound of toasting.

Some Embodiments

In the present disclosure acoustic sensors, including microphones, are utilized to detect sounds distinctive to the toasting of a product, for example toastable foodstuff. As an example of sonic events that may be analyzed to determine the termination of the toasting cycle, some areas of the product to be toasted turn brown, and eventually burn faster than others resulting in the sounds. These sounds occur in foodstuff during toasting when oxidation of carbon in the foodstuff occurs, which result in carbonization, take place while the item is being toasted. These sounds may take the form of 'pop' and 'crackle' like sounds, and are discrete sonic events which occur when short sharp explosions take place as a piece of heated foodstuff disintegrates under the pressure of gasses expanding from within the foodstuff. Similar sounds may also occur when sudden contraction of the foodstuff occurs during carbonization. In addition, a 'hissing' sound may occur during the toasting process as moisture is released from the foodstuff as it is heated. Additional sounds of toasting may also be present. As the foodstuff reaches sufficient temperatures to generate the sounds, the sounds may also increase in frequency and volume.

When processed, the signals generated by these sounds can be used to determine the completion of the toasting cycle. The analysis of the frequency and volume of these sounds may be used to control the browning of the foodstuff's surface in an incremental way.

Using microphone sensors to determine the level of browning has distinct advantages over, for example, using an ionization chamber to analyze the amount of gases produced by browning or burning of the item being toasted. The principal advantage being that while it is not practical, and may not even be possible, to account for anomalous browning/burning events using ionization chambers which collect a mixed air sample of the gases produced by all areas of the foodstuff being toasted, it is possible, and the preferred embodiment disclosed herein, to use multiple microphones so as to discount anomalous browning/burning events.

In the preferred embodiment of the present invention, an array of a number of microphones, the optimum quantity as may be determined by those skilled in the art, are distributed across the area of the heating surface. Further, the microphones may be recessed in tubes placed within holes in the heating surface, so as to be separated from the surface by the insulators to protect the microphones by reducing the intensity and quantity of heat transferred to them from the surface on which the heating elements are attached.

Figure 3:
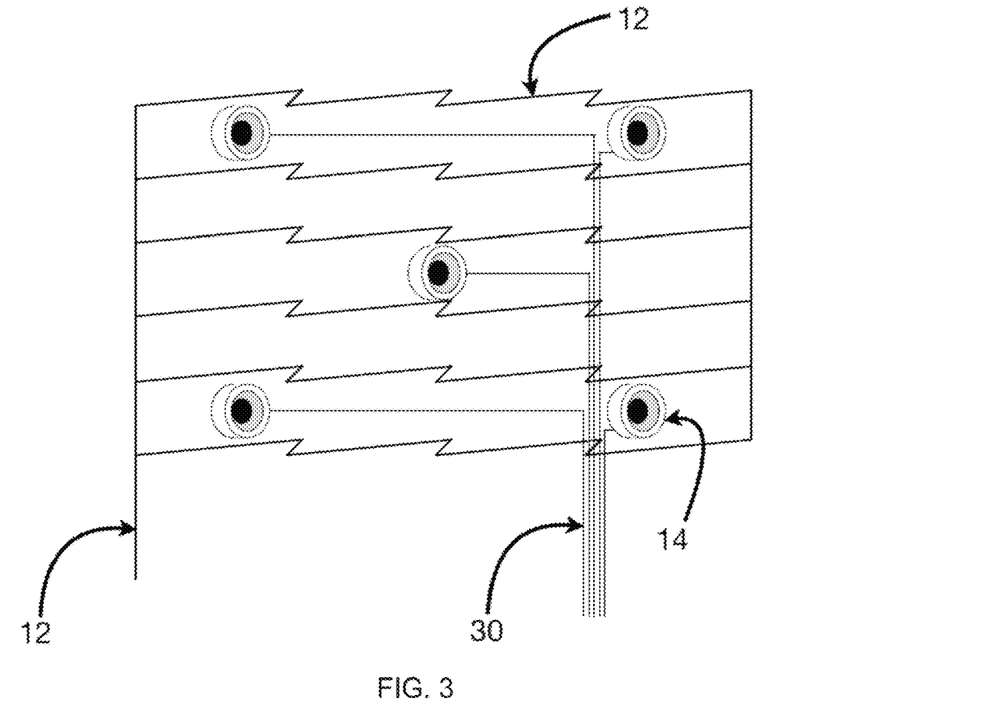
FIG. 3 is a perspective view of heating elements and acoustic sensors according to an example embodiment of the present invention.

FIG. 3 is a perspective view of an embodiment of heating elements 12 and acoustic sensors 14, wherein heating elements 12 comprise six generally parallel heating elements, and acoustic sensors 14 comprise five acoustic sensors arranged generally in an "X" pattern. Acoustic sensors 14 may be electrically connected by wire 30 to controller 16, and/or to a power supply (not shown).

Figure 4:
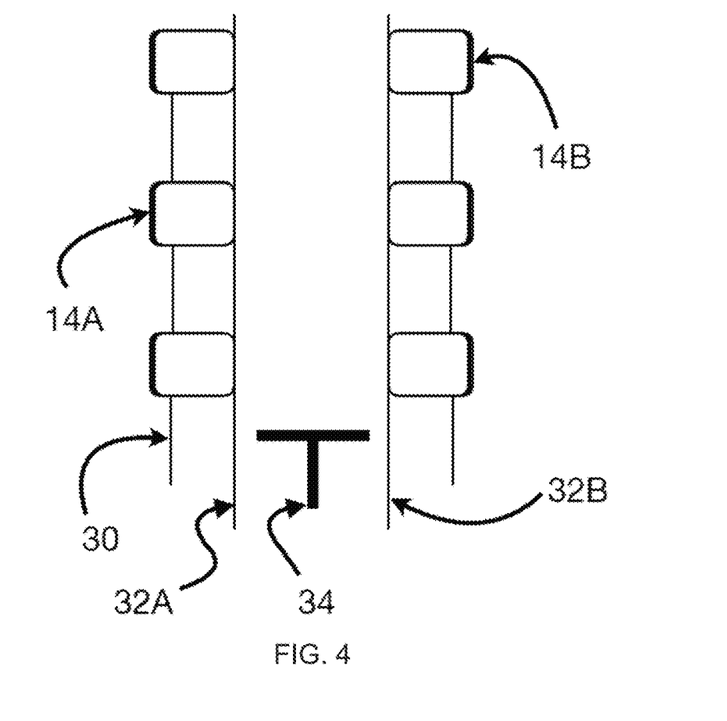
FIG. 4 is a partial side view of a toaster according to an example embodiment of the present invention.

FIG. 4 is a partial side view of toaster 100, where toaster 100 comprises two sets of acoustic sensors 14A and 14B, mounted respectively to side panels 32A and 32B of toaster 100. Side panels 32A and 32B define a recess in toaster 100 for receiving toastable foodstuff. Toastable foodstuff is supported in the recess by foodstuff support 34. Foodstuff support 34 may further comprise an ejection means for ejecting foodstuff from the recess.

By using multiple acoustic sensors, anomalous browning events, that may for example be caused by uneven cutting of the foodstuff to be toasted, or 'tags' of the foodstuff that extend out from the main surface to be toasted that will brown and burn much faster than the main area to be toasted, can be eliminated or averaged from the acoustic signal to be analyzed so as not to erroneously determine when the foodstuff being heated is toasted to the desired amount of browning. The audio signal produced by each acoustic sensor may be compared with audio signal produced by each other of the acoustic sensors using an applicable algorithm or AI, then compared with an established, biased, or machine learnt table of audio signals to determine when the selected browning value, or level of toasting, has been attained.

The present disclosure is directed to using sound to sense when a toasting cycle should be completed, and not the temperature of the toasting device (a toaster) itself. As such, a toaster according to the present disclosure is unaffected by elements of the toasting device storing heat after an initial toasting cycle. For this reason, a toaster according to the present disclosure also has an advantage over conventional timed cycle toasting devices.

The fact that a carbonization (burning) sensor is being used for browning control in a toaster according to the present disclosure has the additional benefit that no further fire-hazard fail-safe devices may be required on the toaster. A toaster according to the present disclosure may stop the toasting process at a programmed or learnt time before the whole piece of foodstuff burns.

Figure 5:
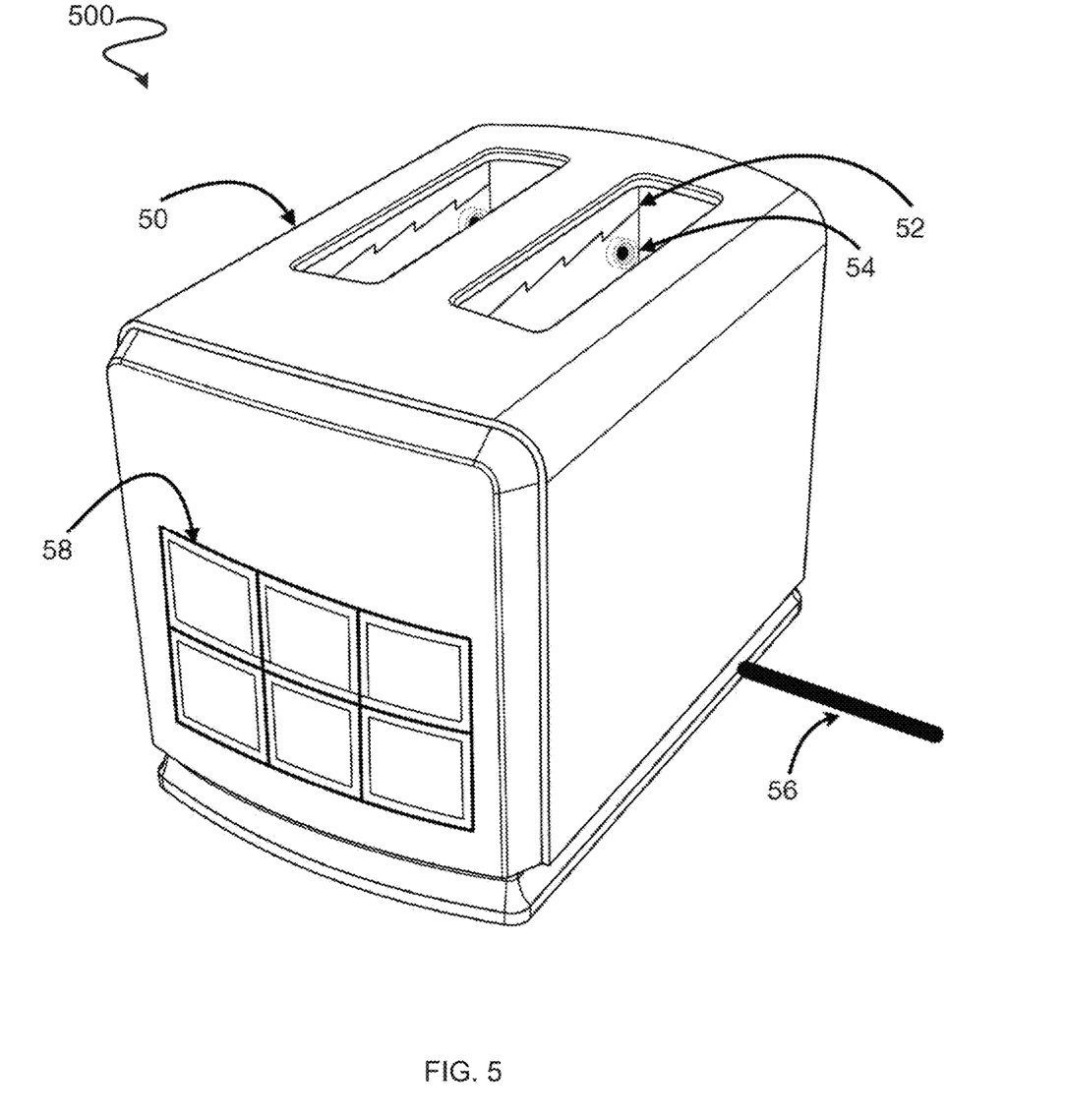
FIG. 5 is a perspective view of a toaster according to a second example embodiment of the present invention.

FIG. 5 is a perspective view of toaster 500 according to an embodiment of the invention. Toaster 500 comprises toaster housing 50 containing heating elements 52 which are connected to a power supply controlled by a computer controlled comparator/threshold detector using output from microphone sensors 54. Toaster 500 is connected to an a/c power supply (not depicted) by a cable 56 and has various controls on electronic control pad 58 for choice of function and amount of browning. Control pad 58 instructs and influences the software/firmware which controls the mechanism and support for holding bread to be toasted, for example support 34, and any associated catch/release device. Control pad 58 may be further configured to accept user feedback or instruction via an integrated touchscreen. These functions may also be controlled remotely by an appropriate software application (sometimes referred to as an "app") running on a user device, for example a smartphone, a tablet computer, a wearable device like a smart watch, and the like.

In some embodiments, acoustic sensors 54 are mounted between heating elements 52 and strategically placed, as may be determined by those skilled in the art, to allow for accurate assessment of the overall level of browning/burning of the foodstuff being toasted. Because of heat transference, one or more electrical connections between acoustic sensors 54 and the control system may not be directly attached to the side panels, and may also be insulated from same.

In some embodiments, each acoustic sensor is wired and treated as a discreet input device in order that acoustic events occurring in different areas of a foodstuff to be toasted may be analyzed independently to arrive at the desired toasting result and such configuration may also be used to discount anomalous toasting events.

In some embodiments, artificial intelligence may be utilized to analyze and refine a toasting cycle by combining the known, learnt, and live acoustic signals of toasting different foodstuffs for optimum personalized results. Artificial intelligence may further combine the results of known and learnt acoustic and timed toasting events.

Some embodiments of the present invention may comprise a body configured to hold two or more pieces of toastable foodstuff in two or more respective separate compartments. Because of the claimed methods of analysis of the toasting state of the toastable foodstuff within a compartment, in an embodiment that incorporates more than one toasting compartment, the heating of foodstuff held by each of the respective compartments may be discretely controlled.

One or more embodiments of the present invention are described as comprising one or more machine learning algorithms and/or artificial intelligence ("AI"). As used herein, a machine learning algorithm and/or AI may comprise any combination of computer hardware and computer software configured to provide the described functionality. For example, a machine learning algorithm may comprise:
 a sequence of computer instructions;
 a look-up table; and
 a trained machine-learning algorithm.

In some embodiments of the present invention, the toaster may comprise a cooking apparatus, for example: a toaster oven, a microwave oven, a conventional oven, and the like. In such embodiments, the body of the apparatus holds cookable and/or heatable foodstuff, and one or more heating and/or cooking elements are mounted to the body and configured to heat and/or cook foodstuff held by the body. The apparatus further comprises one or more acoustic sensors mounted to the body and configured to pick up one or more sounds produced by the foodstuff when the foodstuff is cooked and/or heated by the cooking/heating elements, and generate an audio signal based on the sounds. The apparatus also comprises a controller configured to control the cooking/heating elements based at least in part on the audio signal generated by the acoustic sensors.

In some embodiments of the present invention, the toaster may be configured to toast or cook foodstuff which produces a sound other than from browning and/or toasting. For example, the toaster may be configured to toast and/or cook popcorn, wherein the popcorn produces a popping sound when heated. The acoustic sensors may be configured to pick up the sounds of the popping, and generate an audio signal based on the popping sounds. The controller may be configured to control the cooking/heating elements based at least in part on the audio signal generated by the acoustic sensors from the popping sounds.

Interpretation of Terms

Unless the context clearly requires otherwise, throughout the description and the
 "comprise", "comprising", and the like are to be construed in an inclusive sense, as opposed to an exclusive or exhaustive sense; that is to say, in the sense of "including, but not limited to";
 "connected", "coupled", or any variant thereof, means any connection or coupling, either direct or indirect, between two or more elements; the coupling or connection between the elements can be physical, logical, or a combination thereof;
 "herein", "above", "below", and words of similar import, when used to describe this specification, shall refer to this specification as a whole, and not to any particular portions of this specification;
 "or", in reference to a list of two or more items, covers all of the following interpretations of the word: any of the items in the list, all of the items in the list, and any combination of the items in the list;
 the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, tablet computers, image data encoders, image data decoders, PDAs, color-grading tools, video projectors, audio-visual receivers, displays (such as televisions), digital cinema projectors, media players, and other devices suitable for the purposes described herein. Those skilled in the relevant art will appreciate that aspects of the system can be practised with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics (e.g., video projectors, audio-visual receivers, displays, such as televisions, and the like), set-top boxes, color-grading tools, network PCs, mini-computers, mainframe computers, and the like.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. an acoustic sensor, a heating element, a controller, a software module, processor, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments"

possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention claimed is:

1. A toaster comprising:
    a body configured to hold toastable foodstuff;
    one or more heating elements mounted to the body and configured to heat foodstuff held by the body;
    one or more acoustic sensors mounted to the body and configured to:
        pick up one or more sounds produced by the foodstuff when the foodstuff is heated by the heating elements; and
        generate an audio signal based on the sounds; and
    a controller configured to control the heating elements based at least in part on the audio signal generated by the acoustic sensors.

2. The toaster according to claim 1, wherein the controller is configured to:
    identify a sound of toasting of the foodstuff in the audio signal;
    quantify an inferred level of toasting in the sound of toasting; and
    turn off the heating elements in response to the inferred level of toasting exceeding a threshold level of toasting.

3. The toaster according to claim 2, wherein the sound of toasting comprises one or more of:
    a sound of oxidation of carbon present in foodstuff, a sound of hissing from the foodstuff, a sound of popping of the foodstuff, other sounds associated with cooking of the foodstuff, and other sounds associated with toasting of the foodstuff.

4. The toaster according to claim 2, wherein quantifying the inferred level of toasting in the sound of toasting comprises quantifying one or both of: a frequency of the sound of toasting, and a volume of the sound of toasting.

5. The toaster according to claim 4, wherein quantifying the inferred level of toasting in the sound of toasting comprises averaging one or both of the frequency of the sound of toasting and the volume of the sound of toasting over a time period.

6. The toaster according to claim 2, further comprising a toasting control, and wherein the threshold level of toasting is set by the toasting control.

7. The toaster according to claim 2, wherein the controller is configured to:
    one or both of:
        lookup in a toasting table a threshold sound of toasting corresponding to the threshold level of toasting; and
        determine the threshold sound of toasting corresponding to the threshold level of toasting with an AI; and
    wherein turning off the heating elements in response to the inferred level of toasting exceeding the threshold level of toasting comprises turning off the heating elements in response to the sound of toasting exceeding the threshold sound of toasting.

8. The toaster according to claim 7, wherein the toasting table comprises a plurality of threshold sounds of toasting and corresponding threshold levels of toasting generated at least in part by a machine learning algorithm or the AI.

9. The toaster according to claim 1, wherein the body comprises an ejection mechanism, and the controller is further configured to activate the ejection mechanism based at least in part on the audio signal generated by the acoustic sensors.

10. The toaster according to claim 1, wherein the toaster further comprises one or more of a timer, a temperature sensor, an optical sensor, and a gas sensor, and the controller is configured to turn off the heating elements based at least in part on one or more of the timer, the temperature sensor, the optical sensor, and the gas sensor.

11. The toaster according to claim 1, wherein the body is configured to hold toastable foodstuff in two compartments, and the acoustic sensors are mounted to the body between the two compartments and are configured to pick up one or more sounds produced by the foodstuff in the two compartments when heated by the heating elements.

12. The toaster according to claim 1, wherein:
    the acoustic sensors comprise a first set of one or more acoustic sensors and a second set of one or more acoustic sensors;
    the first set of acoustic sensors are configured to pick up one or more first sounds produced by a first side of the foodstuff when heated by the heating elements and to generate a first audio signal based on the first sounds;
    the second set of acoustic sensors are configured to pick up one or more second sounds produced by a second side of the foodstuff when heated by the heating elements and to generate a second audio signal based on the second sounds; and
    the controller is configured to control the heating elements based at least in part on the first audio signal and the second audio signal.

13. The toaster according to claim 1, wherein the acoustic sensors comprise five or more acoustic sensors, and the acoustic sensors are mounted to the body in an "X" pattern.

14. The toaster according to claim 1, further comprising a display having an integrated touchscreen, and wherein the controller is further configured to receive user input via one or both of the integrated touchscreen and wirelessly from an app running on a user device.

15. The toaster according to claim 1, wherein the toaster comprises one or more of: a toaster oven, a microwave oven, a conventional oven, and the like.

16. The toaster according to claim 15, wherein the controller is further configured to identify a maximum level of toasting in the audio signal, and turn off a power supply in response to identifying the maximum level of toasting.

17. A method for toasting toastable foodstuff with a toaster, the method comprising:
    holding the toastable foodstuff with the toaster;
    toasting the toastable foodstuff with one or more heating elements of the toaster;
    picking up one or more sounds produced by the foodstuff with one or more acoustic sensors of the toaster when the foodstuff is toasted by the heating elements;
    generating an audio signal based on the sounds; and
    controlling the heating elements based at least in part on the audio signal.

18. The method according to claim 17, wherein controlling the heating elements based at least in part on the audio signal comprises:

identifying a sound of toasting of the foodstuff in the audio signal;

quantifying an inferred level of toasting in the sound of toasting; and turning off the heating elements in response to the inferred level of toasting exceeding a threshold level of toasting.

19. The method according to claim 18, wherein the sound of toasting comprises one or more of:

a sound of oxidation of carbon present in the foodstuff, a sound of hissing from the foodstuff, a sound of popping of the foodstuff, other sounds associated with the process of cooking, and other sounds associated with the process of toasting.

20. The method according to claim 18, wherein controlling the heating elements based at least in part on the audio signal comprises:

one or both of:

looking up in a toasting table a threshold sound of toasting corresponding to the threshold level of toasting; and determining the threshold sound of toasting corresponding to the threshold level of toasting with an AI; and wherein turning off the heating elements in response to the inferred level of toasting exceeding the threshold level of toasting comprises turning off the heating elements in response to the sound of toasting exceeding the threshold sound of toasting.

\* \* \* \* \*